United States Patent [19]
Yard

[11] 4,303,980
[45] Dec. 1, 1981

[54] ELECTROMAGNETIC FLOWMETER SYSTEM HAVING AUTOMATICALLY ADJUSTED RESPONSE CHARACTERISTICS

[75] Inventor: John S. Yard, Doylestown, Pa.

[73] Assignee: Fischer & Porter Company, Warminster, Pa.

[21] Appl. No.: 99,736

[22] Filed: Dec. 3, 1979

[51] Int. Cl.³ .................... G01F 1/60; G06F 15/20
[52] U.S. Cl. ............................ 364/510; 364/571; 364/574; 73/861.17
[58] Field of Search ............ 364/509, 510, 571, 574; 73/194 EM, 861.17; 235/92 FL

[56] References Cited

U.S. PATENT DOCUMENTS

| | | | |
|---|---|---|---|
| 3,783,687 | 1/1974 | Mannherz et al. | 73/194 EM |
| 3,833,797 | 9/1974 | Grobman et al. | 364/574 |
| 4,157,035 | 6/1979 | Doll et al. | 73/194 EM |
| 4,159,645 | 7/1979 | Cushing | 73/194 EM |
| 4,167,871 | 9/1979 | Shauger et al. | 73/194 EM |
| 4,193,298 | 3/1980 | Kayama et al. | 73/194 EM |

Primary Examiner—Mark E. Nusbaum
Assistant Examiner—Gary Chin
Attorney, Agent, or Firm—Michael Ebert

[57] ABSTRACT

An electromagnetic flowmeter in which fluid to be metered passes through a flow tube to intersect a magnetic field whereby the voltage induced in the fluid is transferred to a pair of electrodes mounted in the flow tube to yield a flow-induced signal having a random noise component. This field is established by an electromagnet supplied with an excitation current creating a magnetic field that is alternately turned "on" and "off" at a low frequency drive rate. The resultant flow-induced signal is sampled during each "on" and "off" field condition, successive differences therebetween serving to develop an analog output signal having a random noise content. To automatically adjust the output response time of the system as a function of the random noise content and thereby minimize the adverse effects of noise on the system, the analog output signal is fed to a statistical analyzer in which the signal is digitized before being supplied to a microcomputer programmed to determine the statistical significance of the difference between two arithmetic means. To this end, a first series of successive values of the digitized signal is used to establish the first mean and a first variance, and a second series of successive values to establish the second mean and a second variance. The computer, on the basis of the Student "t" statistic, calculates the difference between the two means to produce a digital output signal having the desired response time.

9 Claims, 1 Drawing Figure

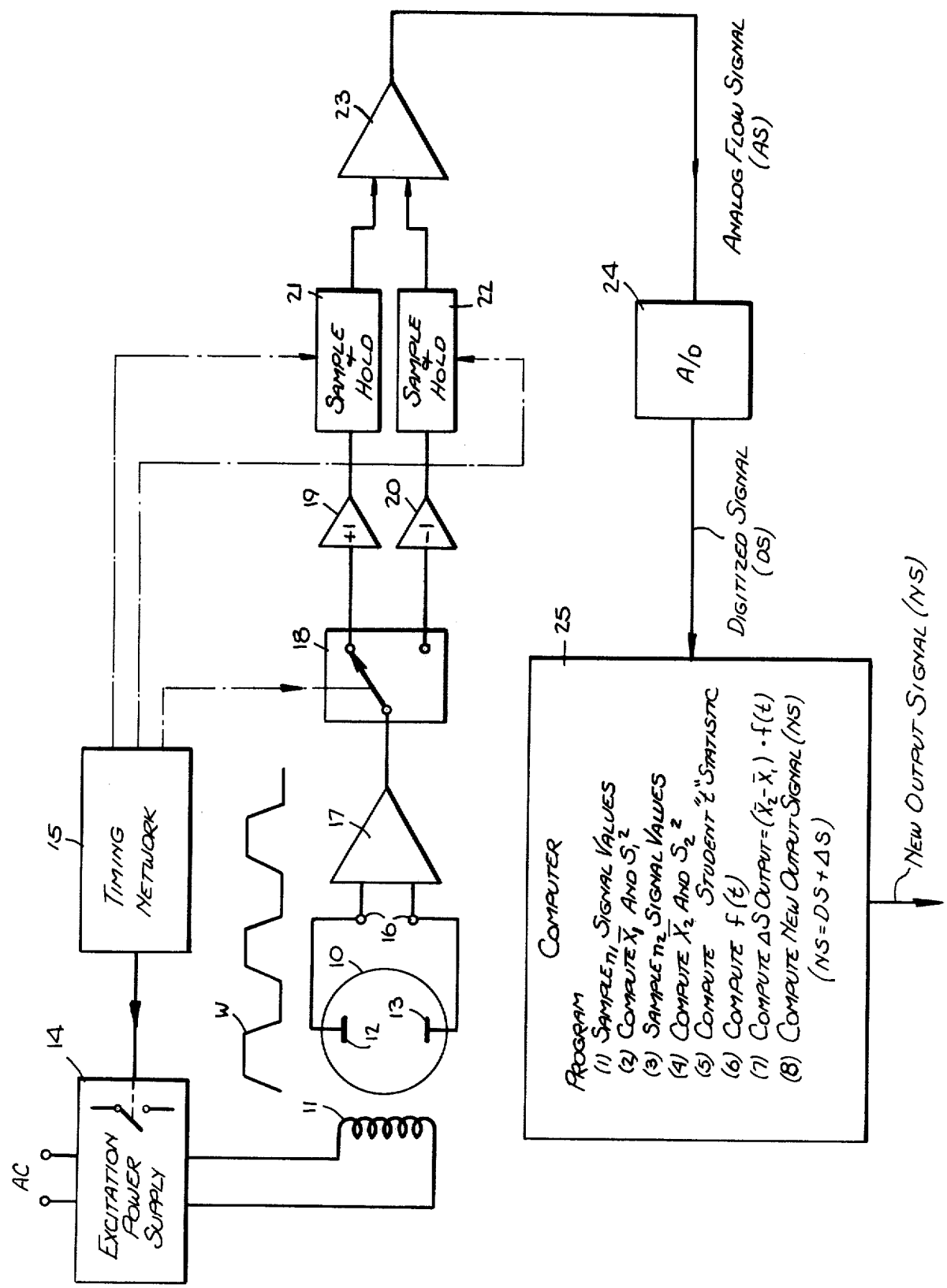

ELECTROMAGNETIC FLOWMETER SYSTEM HAVING AUTOMATICALLY ADJUSTED RESPONSE CHARACTERISTICS

BACKGROUND OF INVENTION

This invention relates generally to an electromagnetic flowmeter system in which the electromagnet of the flowmeter is excited by a low frequency pulsatory current to produce a signal indicative of flow rate, and more particularly to a converter in a system of this type that automatically damps the output signal in a manner depending on the random noise content of the flow signal.

In a conventional electromagnetic flowmeter, the fluid whose flow rate is to be measured is conducted through a flow tube provided with a pair of diametrically-opposed electrodes, a magnetic field perpendicular to the longitudinal axis of the tube being established by an electromagnet. When the fluid intersects this field, a voltage is induced therein which is transferred to the electrodes. This voltage, which is proportional to the average velocity of the fluid and hence to its average volumetric rate, is then amplified and processed to yield an output signal for actuating a recorder or indicator, or for carrying out various process control operations.

The magnetic field may be either direct or alternating in nature, for in either event the amplitude of voltage induced in the liquid passing through the field will be a function of its flow rate. However, when operating with direct magnetic flux, the D-C signal current flowing through the liquid acts to polarize the electrodes, the magnitude of polarization being proportional to the time integral of the polarization current. With alternating magnetic flux operation, polarization is rendered negligible, for the resultant signal current is alternating and therefore its integral does not build up with time.

Though A-C operation is clearly advantageous in that polarization is obviated and the A-C flow-induced signal may be more easily amplified, it has distinct drawbacks. The use of an alternating flux introduces spurious voltages that are unrelated to flow rate and, if untreated, give rise to inaccurate indications. The two spurious voltages that are most troublesome are stray capacitance-coupled voltages from the coil of the electromagnet to the electrodes, and induced loop voltage in the input leads. The electrodes and leads in combination with the liquid extending therebetween constitute a loop in which is induced a voltage from the changing flux of the magnetic coil.

The spurious voltages from the first source may be minimized by electrostatic shielding and by low-frequency excitation of the magnet to cause the impedance of the stray coupling capacitance to be large. But the spurious voltage from the second source is much more difficult to suppress.

The spurious voltage resulting from the flux coupling into the signal leads is usually referred to as the quadrature voltage, for it is assumed to be 90° out of phase with the A-C flow-induced voltage. Actual tests have indicated that this is not true in that a component exists in-phase with the flow induced voltage. Hence, that portion of the "quadrature voltage" that is in-phase with the flow-induced voltage signal constitutes an undesirable signal that cannot readily be distinguished from the flow-induced signal, thereby producing a changing zero shift effect.

Pure "quadrature" voltage has heretofore been minimized by an electronic arrangement adapted to buck out this component, but elimination of its in-phase component has not been successful. Existing A-C operated electromagnetic flowmeters are also known to vary their calibration as a function of temperature, fluid conductivity, pressure and other effects which can alter the spurious voltages both with respect to phase and magnitude. Hence it becomes necessary periodically to manually re-zero the meter to correct for the effects on zero by the above-described phenomena.

All of the adverse effects encountered in A-C operation of electromagnetic flowmeters can be attributed to the rate of change of the flux field $(d\phi)/dt$, serving to induce unwanted signals in the pick-up loop. If, therefore, the rate of change of the flux field could be reduced to zero value, then the magnitude of quadrature and of its in-phase component would become non-existent. Zero drift effects would disappear.

When the magnetic flux field is a steady state field, as, for example, with continuous d-c operation, the ideal condition $d\phi/dt=0$ is satisfied. But d-c operation to create a steady state field is not acceptable, for galvanic potentials are produced and polarization is encountered, as previously explained. In order, therefore, to obtain the positive benefits of a steady state field without the drawbacks which accompany continuous d-c operation, the U.S. Pat. No. 3,783,687 to Mannherz et al. discloses an excitation arrangement in which the steady state flux field is periodically reversed or interrupted. The entire disclosure of this patent is incorporated herein by reference.

In the Mannherz et al. patent, in order to avoid the spurious voltages which result from stray couplings without, however, causing polarization of the electrodes, the electromagnet is energized by a low-frequency square wave. This wave is produced by applying the output voltage of an unfiltered full-wave rectifier to the electromagnet and periodically reversing the voltage polarity at a low-frequency rate by means of an electronic switch.

Since the steady state field produced by the square wave is disrupted by switching transients occurring at the points of reversal, the converter to which the signal from the electrodes is applied includes a demodulator which is dated synchronously with the electronic switch to yield an output signal only when the magnetic flux achieves a steady state condition.

While the Mannherz et al. system avoids spurious voltages, it fails to take into account harmonic noise. Because the excitation current for driving the electromagnet has a predetermined frequency, the flow-induced signal yielded by the electrodes contains harmonic noise components which are even and odd harmonics of the drive frequency. These noises result in a less favorable signal-to-noise ratio and impair the reliability and efficiency of the flowmeter.

The Schmoock et al. patent application Ser. No. 967,137, filed Dec. 7, 1978, now U.S. Pat. No. 4,227,408 discloses an electromagnetic flowmeter in which noise components in the signal arising from harmonics of the drive frequency are suppressed to yield an output signal having a favorable signal-to-noise ratio. In this pending application, whose entire disclosure is incorporated herein by reference, the converter includes a pair of synchronous demodulators operating in phase opposition in conjunction with a common integrator to cancel out selected odd and even harmonic noise components.

In a flowmeter of the type disclosed in the Mannherz et al. patent and in the Schmoock et al. patent application, the flow-induced differential signal derived from the flowmeter electrodes is measured during a portion of each "on" (+) and each "off" (−) condition of the magnetic field in the course of an excitation cycle. Successive differences in this signal are taken as a representation of flow rate. Flow signal changes generate output changes, but these cannot exceed the slew time of the instrument. Thus a typical slew time for an instrument of the type disclosed in the above references is 4S (seconds) for a 100% output excursion.

With an instrument of the type disclosed in these references, when operating with a magnet excitation drive frequency of 3¾ Hz, the state of the magnetic field is changed each 133 ms, as a consequence of which the flow signals are updated at 133 ms intervals. A 4S slew time therefore restricts output changes to a maximum of 133/1000×100/4 which is equal to 3.33% of full scale for each signal update.

The problem to which the present invention is addressed is random noise, as distinguished from harmonic noise which is the concern of the Schmoock et al. patent application. Random noise which arises from various sources is generally intermittent in nature. A major source of random noise is ionically-charged particles in a slurry or a heavily contaminated fluid being metered. Another source is galvanic noise.

For a flow signal having a significant random noise component, the slew time of the instrument is not sufficient to adequately smooth the output signal, and for this reason it is the usual practice to provide an additional time constant smoothing network. The time constant of this network is a fixed value; and since no two field meter installations are subject to the same conditions of random noise, it is necessary in the field to adjust the time constant to cope with the prevailing noise conditions. In the event these conditions undergo change, one is required to readjust the time constant.

The need to tailor the time constant of a given flowmeter installation to accommodate the system to prevailing noise conditions adds materially to installation and maintenance costs. Moreover, where perceptible changes occur in the random noise component of a flowmeter output signal, and a maintenance man is not available to make the necessary adjustment, the signal having a large random noise content may create problems in industrial process control systems or other apparatus governed by the signal.

SUMMARY OF INVENTION

In view of the foregoing, it is the main object of this invention to provide an electromagnetic flowmeter having automatically-adjusted response characteristics to afford flow rate indications in which the adverse effects of random noise are minimized.

More particularly, an object of this invention is to provide a system of the above type in which the electromagnet is excited by a pulsatory current having a low frequency to produce a signal representing flow rate, the system including a converter to automatically damp the signal in a manner depending on the random noise content thereof.

Also an object of the invention is to provide an efficient and reliable converter for the electromagnetic flowmeter system.

Briefly stated, these objects are attained in an electromagnetic flowmeter in accordance with the invention in which fluid to be metered passes through a flow tube to intersect a magnetic field whereby the voltage induced in the fluid is transferred to a pair of electrodes mounted in the flow tube to yield a flow-induced signal having a random noise component. This field is established by an electromagnet supplied with a periodic excitation current creating a magnetic field which during each operating cycle is alternately turned "on" and "off" at a predetermined low frequency drive rate.

The flow-induced signal is sampled during each "on" and "off" field condition, successive differences therebetween serving to develop an analog output signal having a random noise content. To automatically adjust the output response time of the system as a function of the random noise content and thereby minimize the adverse effects of noise on the system, the analog output signal is fed to a statistical analyzer in which the signal is digitized before being supplied to a microcomputer programmed to determined the statistical significance of the difference between two arithmetic means.

To this end, a first series of successive values of the digitized signal is used in the computer to establish the first mean and a first variance, and a second series of successive values to establish the second mean and a second variance. The computer, on the basis of the Student "t" statistic, calculates the difference between the two means to produce a digital output signal having the desired response time.

OUTLINE OF DRAWINGS

For a better understanding of the invention as well as other objects and further features thereof, reference is made to the following detailed description to be read in conjunction with the accompanying drawings, wherein:

The single FIGURE is a block diagram of an electromagnetic flowmeter system which includes a converter in accordance with the invention.

DESCRIPTION OF INVENTION

Referring now to the FIGURE, there is shown an electromagnetic flowmeter system in accordance with the invention adapted to produce an analog signal whose amplitude is proportional to the flow rate of the liquid being measured, this signal having a random noise component. The analog signal is converted into a digital output signal in which the adverse effects of random noise are minimized.

The flowmeter primary includes a flow tube 10 through which the liquid to be measured is conducted. An electro-magnet having a coil 11 is provided to establish a magnetic field which is transverse to the direction of flow. Electrodes 12 and 13 in contact with the flowing fluid are disposed at diametrically-opposed points on the flow tube on an axis which is perpendicular both to the longitudinal direction of flow and the transverse magnetic field.

As is well known, a voltage is induced in the liquid whose flow intersects the magnetic field, this voltage being transferred to the electrodes to produce a signal at flowmeter output terminals that reflects the flow rate. This signal is referred to as the flow-induced signal to distinguish it from random noise components that are independent of flow rate.

Electromagnet coil 11 is energized by a low-frequency square wave W produced by an excitation power supply 14. In practice, this supply may take the form of a transformer whose primary is coupled to a standard 50 or 60 Hz a-c power line, the secondary of the transformer being connected to a full-wave rectifier whose d-c output is applied to coil 11 through an electronic switching device constituted by thyratrons or triacs to produce direct-current pulses at a rate which is low relative to the frequency of the a-c line, such as 3¾ or 7½ Hz. The operation of this switching device is controlled by a timing network 15 and is synchronized thereby with the operation of the converter in a manner to be later described.

The flow-induced signal appearing at output terminals 16 connected to meter electrode 12 and 13 of the primary is applied to the first stage of a secondary or converter, the stage being an a-c pre-amplifier 17. This signal has a generally square-wave formation, but for surges appearing at the leading and trailing edges of the square wave pulses. Since it is the constant level portion of the flow-induced square-wave signal that reflects the steady state condition of the magnetic field and has an amplitude directly proportional to the velocity of the liquid being metered, it is only this portion of the signal which is retained for purposes of accurate flow rate measurement.

To this end, the output of pre-amplifier 17 is alternately fed through an electronic switch 18 governed by timing network 15, to amplifier 19 (+1) and to amplifier 20 (−). Thus during the steady state "on" portion of the field resulting from the pulsatory excitation, the signal from the primary is applied to the +1 amplifier and during the "off" portion to the −1 amplifier.

The output of amplifier 19 is fed to a sample and hold circuit 21 while the output of −1 amplifier 20 is fed to a sample and hold circuit 22 whose alternate operations are synchronized by timing network 15. The outputs of the two sample and hold circuits are applied to the respective inputs of a differential amplifier 23 whose outputs is an analog signal AS which represents the difference between the successive "on" and "off" signals and is therefore representative of the flow rate. Analog signal AS has a random noise component.

In order to automatically adjust the output response time of the system as a function of the random noise content so as to significantly damp the output when the noise level is heavy and to reduce the damping when the noise level is light, the analog flow signal is applied to a statistical analyzer constituted by an A/D converter 24 which converts the analog signal to a digitized signal DS and applies this signal as input data to a digital microcomputer 25.

A digital computer is a machine capable of carrying out arithmetic or logic operations on digital data entered into its input and of yielding at its output numerical results or decisions. All digital computers, whether in large-scale general-purpose form or in microcomputer form, are essentially composed of a central processing unit, a memory system and input-output devices.

The task assigned to a central processing unit (CPU) is to receive and to store for later processing, data in the form of binary digits or bits (0's or 1's), to perform arithmetic or logic operations on this data in accordance with previously-stored instructions, and to deliver the results to the user of the computer through a read-out device such as a cathode ray display tube or in the form of an output signal. Thus a digital computer may be used in conjunction with industrial process control loops to compare the process variable in each loop with a set point and to provide an output signal which depends on the deviation of the variable from the set point.

The number of digits or bits needed to represent a computer instruction or the number of bits needed to represent the largest data element normally processed by the computer is referred to as a "word." The number of bits that a computer is capable of processing as a unit is known as a "byte". A byte may be equal to or less than the number of bits in a word; hence both an 8-bit or a 16 bit word-length computer is capable of processing data in 8-bit bytes.

The central processing unit is that component of the computer which controls the interpretation and execution of instructions. In general, a CPU contains the following elements: "Control" which includes logic and instructions for decoding and executing the program stored in "memory"; "Registers" which provide control with temporary storage in the form of random-access memories (RAM's) and their associated functions; an Arithmetic and Logic Unit (ALU) that performs arithmetic and logic operations under supervision of control.

A microprocessor is the central processing unit of a computer with its associated circuitry that is scaled down by integrated-circuit techniques to fit on one or more silicon chips containing thousands of transistors, resistors or other electronic circuit elements. By combining a microprocessor with other integrated circuit chips that provide timing, random access memory, interfaces for input and output signals and other ancillary functions, one can thereby assemble all of the necessary components of a microcomputer whose master component is the microprocessor. Suitable microprocessors for this purpose are the INTEL 808A or 8085, MOTOROLA 6800 and FAIRCHILD F8.

The memory system is that component of a computer which holds data and instructions, each instruction or datum being assigned a unique address that is used by the CPU when fetching or storing the information. There are three distinct types of memories, each of which in a microcomputer can be reduced to a single silicon chip. The read-only memory or ROM is a memory adapted to store information permanently, such as a math function or a micro-program (a special purpose program initiated by a single instruction in the system's main program). A memory that can be programmed by the user, but only once, is known as a programmable ROM or PROM; hence when a PROM is programmed, it then functions as a ROM.

The term read/write memory signifies that the memory is capable of storing information (write) and of retrieving the stored information (read) at an identical or similar rate. In a computer, a random-access memory (RAM) is a read-write memory adapted to store information in such a way that each bit of information can be retrieved within the same amount of time as any other bit.

The capability of a computer depends in good part on storage capacity of its memory system. The amount of information stored ranges from fewer than 100 bits to more than a billion bits for a large scale computer. Integrated-circuit memories based on transistors are designed to store bits or binary digits on a chip. Currently, the most advanced RAM chip that is available commercially has a maximum storage capacity of 16,384 bits.

The basic "hardware" components of a digital computer are the central processing unit (CPU), the memory system and the input-output (I/O) device. The registers, the control and the arithmetic logic unit of the CPU is linked with the memory system and the I/O device by a data bus; that is, a group of wires that allows the memory, the CPU and the I/O to exchange "words."

The "software" associated with a computer are those expedients by which the computer is explicitly told what to do through a step-by-step sequence of individual instructions which together constitute a program to perform some specific function to yield a solution to a specific problem. An "instruction" is a group of bits that define a particular computer operation. Thus an arrangement may direct a computer to move data, to carry out arithmetic and logic operations, to control I/O devices, or to make a decision as to which instruction is to be executed next.

The computer technique for automatically adjusting the output response time as a function of the random noise content of the input signal makes use of the Student's "t" statistic to establish the statistical difference of the difference between two arithmetic means. For this purpose, a first series having $n_1$ points of successive values of the input signal is used to establish a mean value $\bar{X}_1$ and a variance $S_1^2$. Then a second series having $n_2$ points of successive values of the input signal is used to establish a mean value $\bar{X}_2$ and a second variance $S_2^2$.

In the computer, the value of "t" is computed on the basis of the following equation taken from the VNR Concise Encyclopedia of Mathematics—Gallert, West et al., First American Edition, 1975—Van Nostrand Reinhold, page 603.

$$t = \frac{[\bar{X}_1 \bar{X}_2]}{\sqrt{\left[\frac{(n_1-1)S_1^2 + (n_2-1)S_2^2}{F}\right]\left[\frac{1}{n_1}+\frac{1}{n_2}\right]}}$$

where: $F = n_1 + n_2 - 2$

In operation, a large value of "t," as would occur with small variances and large differences between the two arithmetic means, represents a high probability that the difference $\bar{X}_2 - \bar{X}_1$ is real and not due to chance. On the other hand, a small value of "t" caused by large variances and small differences between the two arithmetic means represents a high probability that the difference $\bar{X}_2 - \bar{X}_1$ is caused by chance.

If then one modifies the output of the system as a function of "t," it becomes possible to bring about large output changes when "t" is large and $\bar{X}_2$ is significantly different from $\bar{X}_1$ and to effect small or no changes in output when "t" is small and $\bar{X}_2$ is less different from $\bar{X}_1$.

Thus $\Delta$ output $= (\bar{X}_2 - \bar{X}_1) \cdot f(t)$ If $f(t)$ were to take the form $f(t) = 1 - e^{-t/k}$, the output would change by reason of the difference in the two means when "t" is very large and would change little when "t" is very small.

Many f (t) functions are conceivable, the foregoing being presented merely as an example thereof. Moreover f (t) need not be an analytic function, but may be considered as any algorithm, including a program of computations and logical rules.

Thus a preferred form of program to be carried out in microcomputer 25 runs as follows:

(1) First, a series of signal values having $n_1$ points are sampled.

(2) From this sampling, the values $\bar{X}_1$ and $S_1^2$ are computed.

(3) Then a second series of signal values having $n_2$ points are sampled.

(4) From the second sampling, the values $\bar{X}_2$ and $S_2^2$ are computed.

(5) Now that the values of $\bar{X}_1$, $S_1^2$, $\bar{X}_2$ and $S_2^2$ are established, the Student "t" statistic can be computed.

(6) With the value of "t" available, the function f(t) is determined.

(7) Then $\Delta$ S output $= (\bar{X}_2 - \bar{X}_1) \cdot f(t)$ is computed.

(8) The digitized output signal NS yielded by the computer is computed by adding the digitized input signal to $\Delta$ S.

Many variations in the time response are possible by selection of the algorithm f (t) and by selection of the number of sample points $n_1$ and $n_2$. These points need not be independent sets. For example, if "t" is small, $n_2$ can be added to $n_1$ to form a new set $n_1$ and the mean of this new set compared with the mean of the next set of $n_2$ samples.

Modifications

While in the foregoing sections of this specification, the invention has been described in the context of an electromagnetic flowmeter whose electromagnet is excited by periodic pulses to create a magnetic field that is alternately turned "on" and "off", it is applicable to other flowmeter arrangements. Thus the invention is useful in conjunction with a flowmeter electromagnet that is alternately excited by a pulsatory wave in a plus and minus mode, the resultant electrode signal being sampled during each positive pulse period and during each negative pulse period, successive differences therebetween developing an analog output signal having a random noise content. The system operating with this electromagnetic flowmeter will include a converter to automatically damp the signal in a manner depending on the random noise content thereof. Indeed, the invention is applicable to all magnetic flowmeter drive arrangements which employ multiple values of steady-state flux.

It is also to be borne in mind that the invention though of particular value in connection with electromagnetic flowmeters, is by no means limited thereto. The invention is generally applicable to any sampling system in which random noise is superimposed over the desired signal. The invention is therefore usable with ultrasonic, variable area, differential pressure and other forms of flowmeters as well as with level measuring devices, pressure sensors and other sensors adapted to detect changes in a physical variable.

While there has been shown and described preferred embodiments of electromagnetic flowmeters and other systems having automatically adjusted response characteristics in accordance with the invention, it will be appreciated that many changes and modifications may be made therein without, however, departing from the essential spirit thereof.

I claim:

1. An electromagnetic flowmeter system having an automatically-adjusted response time comprising:
  A. a flow tube through which a fluid to be metered is conducted, said tube being provided with a pair of diametrically-opposed electrodes;
  B. an electromagnet excited by a low-frequency pulsatory current wave having alternate levels to produce a field in said tube which is intercepted by the fluid to induce a signal in said electrodes, said field being in a first state during one level and in a second state during the other level;

C. means to sample the signal during each first and second state of the field and to develop an analog output signal depending on successive differences therebetween, said analog output signal having a random noise content;

D. a statistical analyzer including an analog-to-digital converter to digitize said analog output signal and a microcomputer responsive to the digitized signal and programmed to determine the statistical significance of the difference between two arithmetic means, a first series of successive values of the digitized signal being used to establish the first mean and a first variance, and a second series of successive values being used to establish the second mean and a second variance, the computer on the basis of the Student "t" statistic calculating the difference between the two arithmetic means to produce a digital output signal whose response time is a function of the random noise content, thereby minimizing the adverse effects of noise on the system.

2. A flowmeter as set forth in claim 1, wherein said pulsatory wave is constituted by a train of pulses to produce a field in the tube which is in an "on" state during the pulses and in an "off" state in the intervals therebetween, the signal being sampled during each "on" and "off" state.

3. A system as set forth in claim 1, wherein $$t = \frac{[\overline{X}_1 \overline{X}_2]}{\sqrt{\left[\frac{(n_1 - 1) S_1^2 + (n_2 - 1) S_2^2}{F}\right] \left[\frac{1}{n_1} + \frac{1}{n_2}\right]}}$$

where:

$n_1$ is the number of points in the first series of successive values;

$n_2$ is the number of points in the second series of successive values;

$\overline{X}_1$ is the arithmetic mean derived from the first series;

$S_1^2$ is the arithmetic mean derived from the second series;

$\overline{X}_2$ is the arithmetic mean derived from the second series;

$S_2^2$ is the variance derived from the second series; and $F = n_1 + n_2 - 2$.

4. A system as set forth in claim 3, wherein said microcomputer is programmed to carry out the following program:

(A) first, an $n_1$ series of signal values are sampled;

(B) from this sampling, values $\overline{X}_1$ and $S_1^2$ are computed;

(C) then an $n_2$ series of signal values are sampled;

(D) from the second sampling, values $\overline{X}_2$ and $S_2^2$ are computed;

(E) from the values established in B and D, the value of Student "t" statistic is computed;

(F) the function f (t) is now determined;

(G) a $\Delta$ S output is computed from the equation $\Delta S = (\overline{X}_2 - \overline{X}_1) \cdot f$ (5);

(H) the output signal of the computer is computed by adding $\Delta$ S to the digitized signal.

5. A system as set forth in claim 2, wherein said pulses are generated by an excitation source constituted by a rectified power supply coupled to a standard a-c power line to produce a direct-voltage which is periodically interrupted at a rate which is low relative to the line frequency.

6. A system as set forth in claim 5, wherein said flow-induced signal is sampled by an electronic switch which applies the signal during a portion of the "on" state to one sample and hold device, and during a portion of the "off" state to another sample and hold device.

7. A system as set forth in claim 6, wherein the respective outputs of said sample and hold devices are applied to a differential amplifier to produce said analog signal.

8. A system as set forth in claim 7, further including a timing network to synchronize the operation of said electronic switch and said sample and hold devices.

9. A system for measuring a physical variable to produce a digital output signal having an automatically-adjusted response time to minimize the adverse effect of random noise on the reliability and efficiency of the system, said system comprising:

A. sensing means responsive to said variable to produce an analog output signal as a function of said variable, said signal having a random noise content that is intermittent in nature; and B. a statistical analyzer including an analog-to-digital converter to digitize said analog output signal and a micro-computer responsive to the digitized signal and programmed to determine the statistical significance of the difference between two arithmetic means, a first series of successive values of the digitized signal being used to establish the first mean and a first variance, and a second series of successive values being used to establish the second mean and a second variance, the computer on the basis of the Student "t" statistic calculating the difference between the two arithmetic means to produce a digital output signal whose response time is a function of the random noise content, thereby minimizing the adverse effects of noise on the system.

* * * * *